Patented Dec. 12, 1939

2,182,964

UNITED STATES PATENT OFFICE 2,182,964

COLORATION OF TEXTILE AND OTHER MATERIALS

Henry Dreyfus, London, and Robert Wighton Moncrieff, Spondon, near Derby, England, assignors to Celanese Corporation of America, a corporation of Delaware No Drawing. Application July 29, 1937, Serial No. 156,313. In Great Britain August 13, 1936

13 Claims. (Cl. 8—35)

This invention relates to the coloring with vat dyestuffs of textile and other materials, more particularly such as are made of cellulose acetate or other cellulose ester or ether.

According to the present invention cellulose-ester or -ether textiles are colored by applying thereto a dye liquid prepared by bringing together a salt of an ester of a leuco vat dyestuff, an acid, and an organic liquid medium, and thereafter converting the dyestuff derivative thus incorporated in the textile to the parent vat dyestuff.

The acid and the salt of the ester of the leuco vat dyestuff may be brought together in the presence of the organic liquid medium. For example, the acid may be mixed with the organic liquid medium and the salt of the ester added to the mixture. Again, the salt of the ester may be mixed with the organic liquid medium and the acid then added to the mixture. On the other hand, the acid and the salt of the ester may be mixed together before mixing with the organic liquid medium.

As an alternative to preparing the dye liquid before applying it to the material the salt of the ester may be mixed with the organic liquid medium, the cellulose-ester or -ether material introduced into the mixture and the acid then added to the latter. In this alternative process the treatment of the salt of the ester with the acid takes place in the presence of the cellulose-ester or -ether material. If desired the material may be introduced into a mixture of the acid with the organic liquid medium and the salt of the ester then added.

The conversion of the dyestuff derivative incorporated in the material to the parent vat dyestuff can readily be effected by the action of an acid oxidising agent, e. g., an acidified aqueous solution of sodium nitrite or of potassium bichromate.

The organic liquid medium is preferably one having a swelling action on the cellulose-ester or -ether material to be colored. Further, it is convenient to employ a liquid medium which is fairly readily volatile, e. g. it may with advantage have a boiling point below about 150° C., for example below 130° C.

When coloring cellulose-acetate materials lower aliphatic alcohols have been found particularly suitable as the organic liquid media, for example ethyl alcohol, propyl alcohol, isopropyl alcohol, and butyl alcohols.

Another type of liquid suitable for use as the organic liquid medium is a mixture of an organic liquid having substantially no solvent or swelling action on the material with a further liquid which is a good solvent or swelling agent for the material treated, both constituents of such mixture being preferably readily volatile.

Thus in treating cellulose acetate materials, there may be employed a mixture of a hydrocarbon, preferably one having a boiling point below about 120° or 130° C., with a solvent or strong swelling agent for cellulose acetate. Thus, mixtures prepared with aliphatic hydrocarbons, for instance petrol (gasoline) or other petroleum fractions, may be used. Again, aromatic hydrocarbons may be employed, for example benzene, toluene, xylene and the like.

Instead of hydrocarbons such as petrol (gasoline) there may be employed other liquids having similar properties as regards solvent or swelling behavior towards cellulose acetate. Hydrocarbons do not in general dissolve cellulose acetate, and further, they usually have but a very small swelling action on this material. Liquids which are similar in these respects are included among the halogenated hydrocarbons, for example trichlorethylene, perchlorethylene and carbon tetrachloride, especially the last-mentioned. Such liquids are hereinafter referred to as being of the hydrocarbon type.

As indicated above, liquids of the hydrocarbon type are employed in admixture with liquids, preferably readily volatile, which are solvents or strong swelling agents for cellulose acetate. As examples of such liquids may be mentioned esters, e. g., ethyl acetate, propyl or isopropyl acetate or other esters boiling below 150° C., ketones, for instance acetone or methyl-ethyl-ketone, alcohols, for instance aliphatic alcohols such as methyl, ethyl, or isopropyl alcohols, and cyclic alcohols such as cyclohexanol or methyl cyclohexanols. A useful mixture for the purposes of the present invention is that of petrol with acetone or isopropyl alcohol. The acetone or isopropyl alcohol or like liquid may constitute from 5–15% of the combined weight of the petrol and acetone or the like.

As regards the acids, inorganic acids, for example hydrochloric acid or other strong inorganic acid are particularly suitable. Organic acids may be used, however, for example formic or acetic acid. If desired two or more acids may be employed for the production of the dye liquid. For instance both an organic acid and an inorganic acid, e. g. acetic acid and hydrochloric acid, may be used. The acid is preferably used in quantity at least equivalent to the salt of the ester of the leuco vat dyestuff employed. A greater proportion of acid is very frequently advantageous, especially when the acid is one having a swelling action on the cellulose-ester or -ether material to be colored. Acid in the proportion of from about 1 to about 10% on the weight of the organic liquid medium may conveniently be used.

A particularly convenient method of working is to mix the salt of the ester with an organic acid, e. g. acetic acid, and then to dilute with the organic liquid medium, e. g. isopropyl alcohol, and thereafter to add a strong mineral acid such as hydrochloric acid.

If desired the dye liquid may contain water in small proportion, e. g. from about 1% to about 5% of the total liquid.

The dye liquid preferably contains a reducing agent to prevent premature oxidation to the vat dyestuff. Suitable agents of this kind are zinc and sodium formaldehyde sulphoxylates.

The salts of esters of leuco vat dyestuffs employed according to the invention may, for instance, be salts of esters of leuco vat dyestuffs of the indigoid series, in which term we include indigoid dyestuffs containing a pyrrole nucleus or a thiophene nucleus or nuclei of each of these types. Salts of esters of leuco anthraquinone vat dyestuffs can also be employed, for example those derived from vat dyestuffs containing a single anthraquinone nucleus, e. g. those derived from anthraquinone 1(NH)—2(CO)—acridones, anthraquinone 1(S)—2(CO) thioxanthones, and acidylamino-anthraquinones, such as 1.4 and 1.5-di(benzoylamino)-anthraquinones, 1-oxy-4-benzoylamino-anthraquinone and other benzoyl amino-anthraquinones.

Salts of esters of leuco vat dyestuffs with sulphuric and phosphoric acids are suitable for the purposes of the present invention. Salts with organic bases, e. g., methylamine or pyridine, or triethanolamine or other alkylolamine, may be employed. Such salts with organic bases have considerable advantages as regards their solubility in organic liquid media. Other salts can, however, be used, e. g., the alkali-metal salts.

The dye liquids can be applied to the materials in various ways. For example, cellulose-acetate yarn in hank form or cellulose-acetate fabric may be immersed in the dye liquid or the dye liquid may be circulated through bobbins or other packages of cellulose-acetate yarn, rolls of fabric or the like. Threads can be treated by running them through the liquids. Again, padding, printing or other methods of mechanical impregnation may be employed if desired. For instance, textile material may be treated with the dye liquid in the manner and with the apparatus described in co-pending United States applications Serial Nos. 124,138, 124,139 both filed February 4, 1937, and 123,102 filed January 30, 1937.

The new process is of special value in the case of coloring cellulose-acetate textile materials. It may, however, be applied to the coloration of textile materials of other esters or ethers of cellulose, for example cellulose formate, propionate or butyrate, or methyl, ethyl or benzyl cellulose. Materials obtained by esterification of formed textile materials having a basis of organic derivative of cellulose (cf. United States application Serial No. 39,288 filed September 5, 1935,) may be colored by the new process. Such esterified textile materials may, however, require the use of liquids of rather different composition from those suitable for the treatment of the parent materials. Thus, re-acetylated cellulose-acetate textiles may conveniently be treated with a dye liquid prepared with a salt of an ester of a leuco vat dye, isopropyl alcohol and acetic acid and containing from about 30% to about 60% of the acetic acid.

The textile material may consist of cellulose acetate or other cellulose ester or ether alone, or it may consist of cellulose ester or ether in association with other textile fibres. In this case the other textile fibre may, according to its nature, either be colored by the treatment or remain uncolored. Textile materials other than cellulose esters or ethers may also be colored by the new process, more particularly animal fibres such as natural silk or wool.

If desired textile materials containing cellulose ester or ether filaments which contain titanium dioxide, carbon black or other pigments may be colored by the new process. For example, cellulose acetate yarn of low lustre, owing to the presence therein of titanium dioxide, may be colored. Again, a yarn of cellulose acetate filaments having a grey color due to the presence of carbon black therein may be topped by the new process.

The new process, while of special value in connection with the coloration of textile materials, may be used for the coloring of other materials having one dimension small, e. g., films or foils of cellulose acetate or other cellulose ester or ether.

The invention is illustrated by the following examples:

*Example I*

1 kgm. of Indigosol Green AB is mixed with 10 litres of isopropyl alcohol, 500 grams sodium formaldehyde sulphoxylate added and the resultant solution diluted with 90 litres of petrol (gasoline). 2 litres of acetic acid are then added. Cellulose-acetate yarn is treated in the bath so prepared for 1 hour at 40° C., well washed with hot petrol, dried, and treated with acidified aqueous potassium bichromate solution. A bright green dyeing of good fastness to scouring and rubbing is obtained.

*Example II*

1 kgm. Soledon Brilliant Purple 2RS is mixed with 2 litres of acetic acid and the mixture made up to 100 litres with isopropyl alcohol. 500 gms. of zinc formaldehyde sulphoxylate dissolved in 2 litres of water are then added, followed by two litres of hydrochloric acid. Cellulose-acetate yarn is then impregnated with this solution by circulating the liquid for ½ hour at 16° C. through the yarn, the latter being wound on a perforated bobbin. The yarn is then well washed in cold water and immersed for ½ hour in a warm aqueous nitrous-acid solution prepared with 3 grams/litre sodium nitrite and 10 cc./litre hydrochloric acid. On washing and drying a purple dyeing of good fastness to boiling is obtained.

Having described our invention, what we desire to secure by Letters Patent is:

1. Process for dyeing textile materials, films, foils and like materials which have a basis of an organic derivative of cellulose, which comprises dyeing said materials in a bath containing an acid, a salt of an ester of a leuco vat dyestuff, a reducing agent and an organic liquid medium containing at most only a small proportion of water, and thereafter converting the dyestuff derivative on the materials to the parent vat dyestuff by treating with an acid oxidizing agent.

2. Process for dyeing textile materials, films, foils and like materials which have a basis of cellulose acetate, which comprises dyeing said materials in a bath containing an acid, a salt of an ester of a leuco vat dyestuff, a reducing agent and an organic liquid medium containing at most only a small proportion of water, and thereafter converting the dyestuff derivative on the materials to the parent vat dyestuff by treating with an acid oxidizing agent.

3. Process for dyeing textile materials, films, foils and like materials which have a basis of organic derivatives of cellulose, which comprises forming a bath containing a salt of an ester of a leuco vat dyestuff, a reducing agent and an organic liquid medium containing at most only a small proportion of water, placing the material having a basis of an organic derivative of cellulose in said bath, adding an acid to the bath while said material is present therein, and thereafter converting the dyestuff derivative on the material to the parent vat dyestuff by treating with an acid oxidizing agent.

4. Process for dyeing textile materials, films, foils and like materials which have a basis of organic derivatives of cellulose, which comprises forming a bath containing an acid, a reducing agent and an organic liquid medium containing at most only a small proportion of water, placing the material having a basis of an organic derivative of cellulose in said bath, adding a salt of an ester of a leuco vat dyestuff to the bath while said material is present therein, and thereafter converting the dyestuff derivative on the material to the parent vat dyestuff by treating with an acid oxidizing agent.

5. Process for dyeing textile materials, films, foils and like materials which have a basis of cellulose acetate, which comprises forming a bath containing a salt of an ester of a leuco vat dyestuff, a reducing agent and an organic liquid medium containing at most only a small proportion of water, placing the material having a basis of cellulose acetate in said bath, adding an acid to the bath while said material is present therein, and thereafter converting the dyestuff derivative on the material to the parent vat dyestuff by treating with an acid oxidizing agent.

6. Process for dyeing textile materials, films, foils and like materials which have a basis of cellulose acetate, which comprises forming a bath containing an acid, a reducing agent and an organic liquid medium containing at most only a small proportion of water, placing the material having a basis of cellulose acetate in said bath, adding a salt of an ester of a leuco vat dyestuff to the bath while said material is present therein, and thereafter converting the dyestuff derivative on the material to the parent vat dyestuff by treating with an acid oxidizing agent.

7. Process for dyeing textile materials, films, foils and like materials which have a basis of cellulose acetate, which comprises forming a bath containing a salt of an ester of a leuco vat dyestuff, a reducing agent and an organic liquid medium which contains a lower fatty alcohol and at most 5% by weight of water, placing the material having a basis of cellulose acetate in said bath, adding an acid to the bath while said material is present therein, and thereafter converting the dyestuff derivative on the material to the parent vat dyestuff by treating with an acid oxidizing agent.

8. Process for dyeing textile materials, films, foils and like materials which have a basis of cellulose acetate, which comprises forming a bath containing an acid, a reducing agent and an organic liquid medium which contains a lower aliphatic alcohol and at most 5% by weight of water, placing the material having a basis of cellulose acetate in said bath, adding a salt of an ester of a leuco vat dyestuff to the bath while said material is present therein, and thereafter converting the dyestuff derivative on the material to the parent vat dyestuff by treating with an acid oxidizing agent.

9. Process for dyeing textile materials, films, foils and like materials which have a basis of cellulose acetate, which comprises forming a bath containing a salt of an ester of a leuco vat dyestuff, a reducing agent and isopropyl alcohol, placing the material having a basis of cellulose acetate in said bath, adding an acid to the bath while said material is present therein, and thereafter converting the dyestuff derivative on the material to the parent vat dyestuff by treating with an acid oxidizing agent.

10. Process for dyeing textile materials, films, foils and like materials which have a basis of cellulose acetate, which comprises forming a bath containing an acid, a reducing agent and isopropyl alcohol, placing the material having a basis of cellulose acetate in said bath, adding a salt of an ester of a leuco vat dyestuff to the bath while said material is present therein, and thereafter converting the dyestuff derivative on the material to the parent vat dyestuff by treating with an acid oxidizing agent.

11. Process for dyeing textile materials, films, foils and like materials which have a basis of cellulose acetate, which comprises forming a bath containing a salt of an ester of a leuco vat dyestuff, a hydrocarbon and swelling agent for cellulose acetate so as to produce a mixture which contains at most 5% by weight of water, placing the material having a basis of cellulose acetate in said bath, adding an acid to the bath while said material is present therein, and thereafter converting the dyestuff derivative on the material to the parent vat dyestuff by treating with an acid oxidizing agent.

12. Process for dyeing textile materials, films, foils and like materials which have a basis of cellulose acetate, which comprises forming a bath containing a salt of an ester of a leuco vat dyestuff, gasoline and isopropyl alcohol, placing the material having a basis of cellulose acetate in said bath, adding an acid to the bath while said material is present therein, and thereafter converting the dyestuff derivative on the material to the parent vat dyestuff by treating with an acid oxidizing agent.

13. Process for dyeing textile materials, films, foils and like materials which have a basis of cellulose acetate, which comprises forming a bath containing a salt of an ester of a leuco vat dyestuff, gasoline and isopropyl alcohol, placing the material having a basis of cellulose acetate in said bath, adding hydrochloric acid to the bath while said material is present therein, and thereafter converting the dyestuff derivative on the material to the parent vat dyestuff by treating with an acid oxidizing agent.

HENRY DREYFUS.
ROBERT WIGHTON MONCRIEFF.